United States Patent
Hartman et al.

(10) Patent No.: US 9,914,544 B2
(45) Date of Patent: Mar. 13, 2018

(54) MECHANICAL AIRCRAFT SILL HEIGHT INDICATOR

(71) Applicant: GOODRICH CORPORATION, Charlotte, NC (US)

(72) Inventors: Drew Hartman, Phoenix, AZ (US); Jaro S. Volny, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 133 days.

(21) Appl. No.: 14/829,391

(22) Filed: Aug. 18, 2015

(65) Prior Publication Data
US 2017/0050737 A1 Feb. 23, 2017

(51) Int. Cl.
- *B64D 25/14* (2006.01)
- *B64C 1/14* (2006.01)
- *A62B 1/20* (2006.01)

(52) U.S. Cl.
CPC ............ *B64D 25/14* (2013.01); *B64C 1/1461* (2013.01); *A62B 1/20* (2013.01)

(58) Field of Classification Search
CPC ..... B64D 25/14; A62B 1/20; B63B 2027/145; B64C 1/1461
See application file for complete search history.

(56) References Cited

U.S. PATENT DOCUMENTS

| | | | |
|---|---|---|---|
| 2,936,056 A | 5/1960 | Heyniger | |
| 3,463,266 A * | 8/1969 | Day | B64D 25/14 182/48 |
| 3,554,344 A | 1/1971 | Summer et al. | |
| 3,833,088 A | 9/1974 | Chacko et al. | |
| 4,690,650 A * | 9/1987 | Bell | B63C 9/01 441/40 |
| 5,711,495 A | 1/1998 | Danielson | |
| 5,820,773 A | 10/1998 | Hintzman et al. | |
| 6,676,082 B2 | 1/2004 | Alberts | |
| 6,814,183 B2 * | 11/2004 | Horvath | B64D 25/14 182/48 |
| 8,215,586 B2 | 7/2012 | O'Donnell et al. | |
| 2003/0080254 A1 * | 5/2003 | Alberts | B64D 25/14 244/137.2 |

OTHER PUBLICATIONS

Extended European Search Report dated Jan. 20, 2017 in European Application No. 16184617.5.

* cited by examiner

*Primary Examiner* — Brian M O'Hara
*Assistant Examiner* — Christopher D Hutchens
(74) *Attorney, Agent, or Firm* — Snell & Wilmer L.L.P.

(57) ABSTRACT

An evacuation system is provided. The system may comprise a door sill, a girt coupled to the door sill, a slide coupled to the girt, and a measurement device coupled the girt and/or the slide. The measurement device may further comprise a line having a predetermined length and a weight coupled to the line, and the measurement device may be configured to adjust a length of the slide in response to a position of the weight. A method is also provided. The method includes opening a door to expose a door sill, inflating the emergency slide with the emergency slide coupled to the door sill, and deploying a measurement device configured to measure a height of the door sill from a surface. The measurement device may comprise a line coupled to the door sill and a buoyant weight coupled to the line, and wherein the line has a predetermined length.

5 Claims, 4 Drawing Sheets

MECHANICAL AIRCRAFT SILL HEIGHT INDICATOR

FIELD

The present disclosure relates to inflatable emergency slides and, in particular, to a mechanical door sill height indicator for an inflatable slide.

BACKGROUND

Emergency evacuation slides may be used to exit an aircraft absent a jet way or other means of egress for passengers. The slides may deploy from a door sill on a side of the aircraft, for example. The sill height may vary in response to the presence of deployed landing gear, the contour of terrain, or a water landing, for example. An evacuation slide performs in the various possible deployment conditions with a suitable slide angle regardless of sill height. However, as the sill height varies the slide angle may vary as well. For example, the sill height of a plane without one of its rear landing gear may be greater than the standard sill height of the aircraft with deployed landing gear. A standard length slide deployed from the increased sill height may result in a steeper slide angle than the same slide would have at standard sill height.

Some evacuation slides may include a toe portion that is inflated or deflated to further adjust the slide angle. The inflation or deflation may depend on measuring the sill height. However, sill height measurements may not be accurate, for example, when an aircraft completes a water landing.

SUMMARY

A measurement device may comprise a slide, a line having a predetermined length and coupled to the slide, and a weight coupled to the line. The measurement device may be configured to adjust a slide length in response to a position of the weight.

In various embodiments, the weight may be buoyant. The weight may comprise at least one of a survival kit or a canopy pouch. The line may comprise at least one of a rope, a cable, a wire, a lanyard, or a braiding. The measurement device may be configured to adjust the slide length by inflating an extension in response to the line suspending the weight. The measurement device may also be configured to adjust the slide length by deflating an extension in response to the weight contacting an exit surface. A girt may be coupled to the slide and the line.

An evacuation system may comprise a door sill, a girt coupled to the door sill, a slide coupled to the girt, and a measurement device coupled the girt and/or the slide. The measurement device may further comprise a line having a predetermined length and a weight coupled to the line, and the measurement device may be configured to adjust a length of the slide in response to a position of the weight.

In various embodiments, the weight may be buoyant. The weight may comprise at least one of a survival kit or a canopy pouch. The line may comprise at least one of a rope, a cable, a wire, a lanyard, or a braiding. The measurement device may be configured to adjust a slide length by inflating an extension in response to the line suspending the weight. The measurement device may be configured to adjust a slide length by deflating an extension in response to the weight contacting an exit surface. The length of the line may be selected based on a desired slide length for a sill height. The measurement device may be configured to release an already inflated portion of the slide into and extended configuration.

A method for deploying an emergency slide may include the steps of opening a door to expose a door sill, inflating the emergency slide with the emergency slide coupled to the door sill, and deploying a measurement device configured to measure a height of the door sill from a surface. The measurement device may comprise a line coupled to the door sill and a buoyant weight coupled to the line, and wherein the line has a predetermined length.

In various embodiments, the buoyant weight may comprise at least one of a survival kit or a canopy pouch. The method may also include inflating an extension of the emergency slide in response to the measurement device being in a fully extended state, and/or deflating an extension in response to the measurement device being in a partially extended state. The emergency slide may be coupled to the door sill through a girt and the measurement device is coupled to the girt. The line may comprise at least one of a rope, a cable, a wire, a lanyard, or a braiding.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Slides according to the present disclosure may measure the distance from a door sill to an exit surface. The exit surface may be a runway, uneven terrain, or water, for example. If the aircraft is resting at a nonstandard pitch or roll angle or the evacuation is uneven or in a liquid, then the measurement device of the present disclosure may identify a non-standard evacuation height from sill to surface. An extension of the slide may be deflated or deflated in response to the position of the measurement device.

Figure 1:
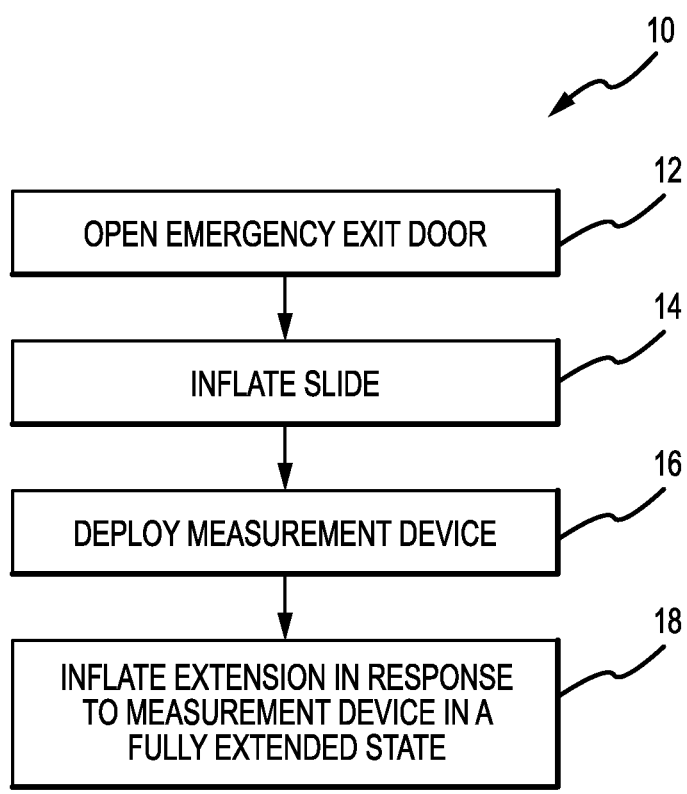
FIG. 1 illustrates a process for measuring a door sill height on an aircraft and inflating a slide extension, in accordance with various embodiments.

With reference to FIG. 1, a method 10 of deploying an emergency evacuation slide is shown, in accordance with various embodiments. Method 10 may be carried out on evacuation system 100 illustrated in FIGS. 3 and 4, for example. Method 10 may begin by opening an emergency exit door (Step 12). The door may be opened by the crew or a passenger in an evacuation situation. The slide may be inflated (Step 14) in response to opening the emergency exit door. The slide may inflate partially or completely, depending on the configuration of the evacuation system. A measurement device may be deployed (Step 16). The measurement device may be configured to measure the distance between the door sill and the exit surface, as detailed below with reference to FIGS. 3 and 4. The measurement device may be deployed prior to inflating the slide, concurrently with inflating the slide, and/or after inflating the slide depending on the configuration of the evacuation system.

In various embodiments, an extension or toe of the slide may be inflated in response to the measurement device being in a fully extended state (Step 18). Similarly, the extension may inflate concurrently with the remainder of the slide and may not be deflated or otherwise jettisoned in response to the measurement device being in a fully extended position. The measurement device being in a fully extended state, for example, may indicate that additional slide length is desirable to reduce the slide angle. In that regard, the length of measurement device 112 may be selected based on a desired slide length for a sill height. The extension may extend from exit portion of the emergency slide to provide additional slide length.

Figure 2:
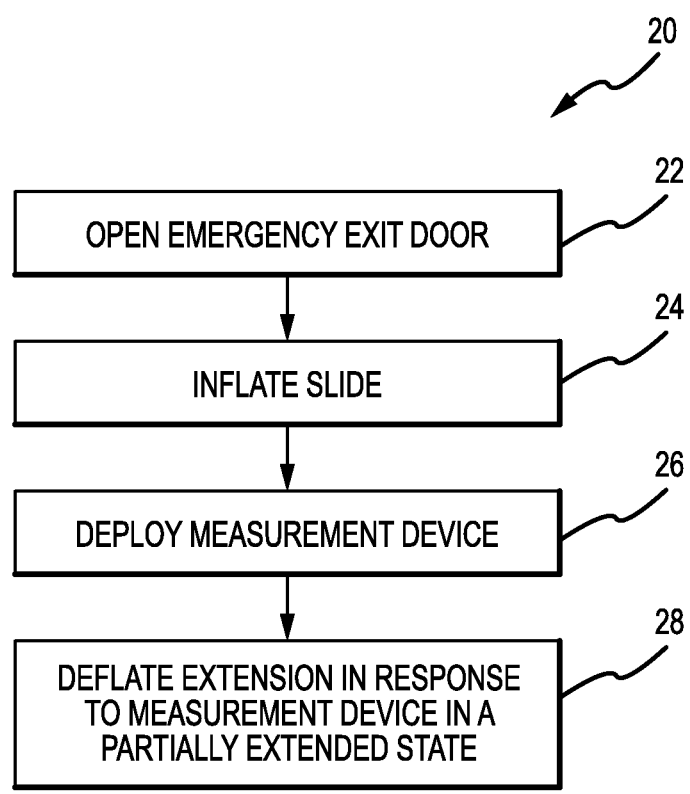
FIG. 2 illustrates a process for measuring a door sill height on an aircraft and deflating a slide extension, in accordance with various embodiments.

With reference to FIG. 2, a method 20 of deploying an emergency evacuation slide is shown, in accordance with various embodiments. Method 20 of FIG. 2 may be similar to method 10 of FIG. 1. Method 10 may begin by opening an emergency exit door (Step 22). The slide may be inflated (Step 24) in response to opening the emergency exit door. The slide may inflate partially or completely, depending on the configuration of the evacuation system. A measurement device may be deployed (Step 26). The measurement device may be configured to measure the distance between the door sill and the exit surface, as detailed below with reference to FIGS. 3 and 4. The measurement device may be deployed prior to inflating the slide, concurrently with inflating the slide, and/or after inflating the slide depending on the configuration of the evacuation system.

In various embodiments, an extension or toe of the slide may be deflated in response to the measurement device being in a partially extended state (Step 28). Similarly, the extension may not be inflated and remain deflated in response to the measurement device being in a partially extended state. The measurement device being in a partially extended state, for example, may indicate that additional slide length is undesirable as the slide angle may tend decrease as more length is added to the slide.

Figure 3:
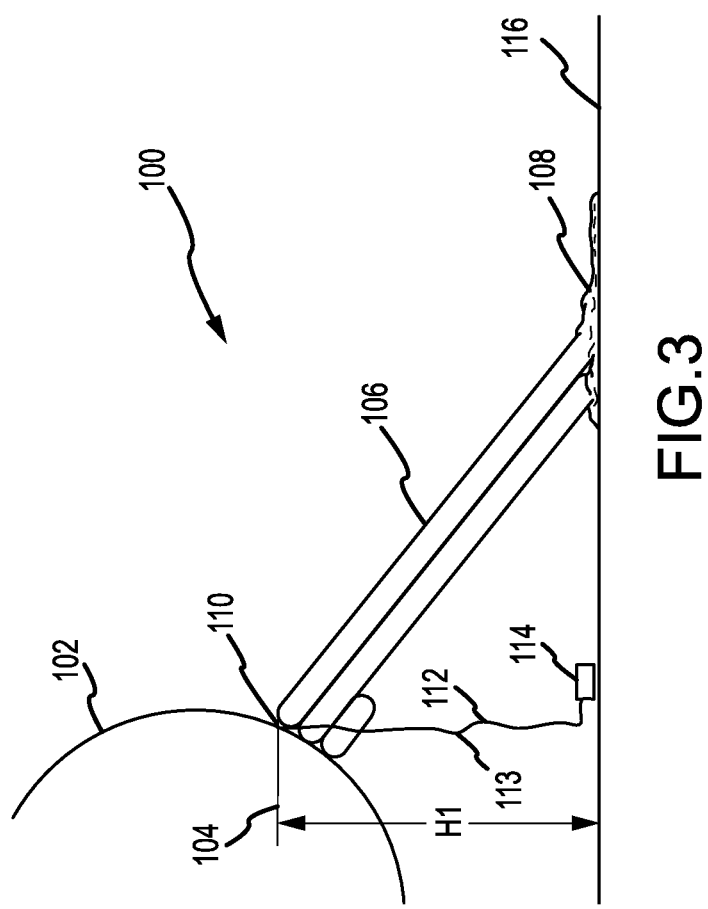
FIG. 3 illustrates an exemplary aircraft having a mechanical sill height indicator taller than a sill height, in accordance with various embodiments.

With reference to FIG. 3, evacuation system 100 is shown having an evacuation slide 106 with measurement device 112 reaching exit surface 116, in accordance with various embodiments. Evacuation system 100 may include a door sill 104 located at an exit of fuselage 102. Door sill 104 may form a lower portion of the threshold of fuselage 102. Evacuation slide 106 may be coupled to door sill 104 by girt 110. In that regard, door sill 104, girt 110, and evacuation slide 106 may form a continuous exit path from fuselage 102.

In various embodiments, door sill 104 may have a height H1 above exit surface 116. Girt 110 may also have a height H1 above exit surface 116. Measurement device 112 may also be coupled to girt 110 and/or door sill 104. Measurement device 112 may comprise a line 113 and weight 114. Line 113 of measurement device 112 may be coupled to evacuation slide 106 and/or girt 110 to measure height H1 of door sill 104 from exit surface 116. Measurement device 112 may measure height H1 in a binary manner to determine whether height H1 is greater than the length of measurement device 112.

In various embodiments, a predetermined height of door sill may be determined, over which extension 108 of evacuation slide 106 should be inflated. If height H1 is less than the predetermined height at which extension 108 should be inflated, then extension 108 may remain deflated or be deflated in response to the measurement of Height H1. Weight 114 may be supported by exit surface 116. Weight 114 reaching exit surface 116 may indicate that the length of measurement device 112 is greater than height H1.

In various embodiments, exit surface 116 may support weight 114 so that a portion of measurement device 112 is supported without increasing the tension on line 113. Measurement device 112 may have a predetermined weight to adjust the slide length by deflation or inflation of extension 108 based on the tension in line 113 in response to line 113 supporting weight 114. Thus, measurement device 112 may not sufficiently load inflation means for extension 108 of evacuation slide 106 to trigger inflation of extension 108 in response to weight 114 contacting exit surface 116. Similarly, measurement device 112 may not sufficiently load deflation means for extension 108 of evacuation slide 106 to prevent deflation of extension 108.

In various embodiments, line 113 may be coupled to a pressure sensitive inflation regulator (i.e., a valve or switch) with a threshold sensitivity that is met in response to the measurement device being fully suspended, but not met in response to the weight being supported by the exit surface. Line 113 may also be coupled to a pressure sensitive valve or switch with a threshold sensitivity that is not met in response to the measurement device being fully suspended but is met in response to the weight being supported by the exit surface. The valve or switch may enable evacuation system 100 to deflate or inflate extension 108. Line 113 may pull the valve or switch to allow inflation.

In various embodiments, weight 114 may comprise a buoyant weight configured to float in water. Weight 114 may also be a multi-purposed weight. For example, weight 114 may be the slide canopy pouch, a first aid kit, a survival kit, a life preserver, a portion of the exit door, or another buoyant piece of flight equipment or an aircraft. In that regard, weight 114 may float and measure height H1 when exit surface 116 is the surface of a body of water. In that regard, measurement device 112 may measure door sill height in case of a water landing.

In various embodiments, line 113 may comprise one or more segments of rope, cable, wire, lanyard, braiding, nylon webbing, and/or other suitable types of line, alone or in combination, extending a desired predetermined distance. Prior to deployment, measurement device 112 may be stored in a compartment of an exit door with slide 106. The line may be coiled and retained within a pack containing slide 106 or outside the pack. The line may be released and uncoil in response to inflation of slide 106.

Figure 4:
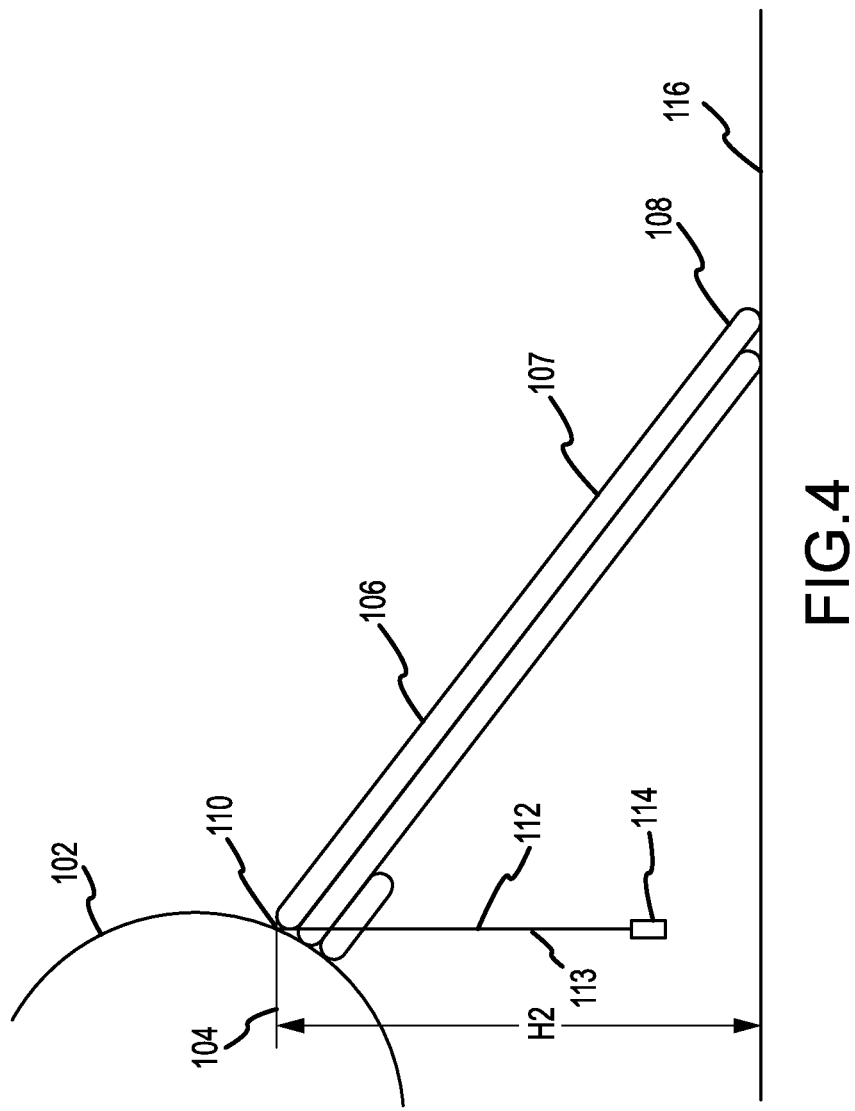
FIG. 4 illustrates an exemplary aircraft having a mechanical sill height indicator shorter than a sill height, in accordance with various embodiments.

With reference to FIG. 4, evacuation system 100 is shown having an evacuation slide 106 with measurement device 112 suspended above exit surface 116, in accordance with various embodiments. Evacuation system 100 may be the same evacuation system 100 illustrated in FIG. 3 with a greater height H2 of door sill 104. Height H2 of door sill 104 may be a result of uneven terrain and/or landing gear height, for example, increasing the distance between fuselage 102 and exit surface 116.

In various embodiments, height H2 of door sill 104 from exit surface 116 may be greater than the length of measurement device 112. As a result, weight 114 may be suspended by line 113 with line 113 supporting weight 114. Tension in line 113 and the weight of measurement device 112 suspended from girt 110 and/or evacuation slide 106 may provide sufficient load to trigger inflation of extension 108 so that both main portion 107 and extension 108 are inflated. Similarly, tension in line 113 and the weight of measurement device 112 suspended from girt 110 and/or evacuation slide 106 may provide insufficient load to trigger deflation of extension 108 so that both main portion 107 and extension 108 remain inflated.

Measurement device 112 of evacuation system 100 may provide a mechanical measurement of door sill height without using the aircraft roll and pitch sensors. Evacuation system 100 may thus be self-contained without electronic connection to flight controls and sensors. Measurement device 112 may reduce aircraft weight by integrating pre-existing aircraft components and flight gear as weight 114.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for deploying an aircraft emergency slide, comprising:
    opening an aircraft fuselage door to expose an aircraft fuselage door sill;
    deploying a measurement device prior to inflating the aircraft emergency slide, the measurement device configured to measure a height of the aircraft fuselage door sill from an exit surface,
    wherein the measurement device comprises a line coupled to the aircraft fuselage door sill and a weight coupled to the line;
    and at least one of partially or completely inflating the aircraft emergency slide, responsive to the measuring device.

2. The method of claim 1, wherein the weight comprises at least one of a survival kit or a canopy pouch.

3. The method of claim 1, further comprising inflating an extension of the aircraft emergency slide in response to the measurement device being in a fully extended state.

4. The method of claim 1, wherein the aircraft emergency slide is coupled to the aircraft fuselage door sill through a girt and the measurement device is coupled to the girt.

5. The method of claim 1, wherein the line comprises at least one of a rope, a cable, a wire, a lanyard, and a braiding.

* * * * *